US012609562B2

(12) United States Patent
Yamasuso et al.

(10) Patent No.: US 12,609,562 B2
(45) Date of Patent: Apr. 21, 2026

(54) STATOR-CORE FIXING STRUCTURE, MAGNETIC BEARING, ELECTRIC MOTOR, BEARINGLESS MOTOR, CENTRIFUGAL COMPRESSOR, AND FIXING METHOD

(71) Applicant: DAIKIN INDUSTRIES, LTD., Osaka (JP)

(72) Inventors: Shouhei Yamasuso, Osaka (JP); Hideki Fujiwara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 212 days.

(21) Appl. No.: 18/369,478

(22) Filed: Sep. 18, 2023

(65) Prior Publication Data

US 2024/0006938 A1 Jan. 4, 2024

Related U.S. Application Data

(63) Continuation of application No. PCT/JP2022/004316, filed on Feb. 3, 2022.

(30) Foreign Application Priority Data

Mar. 19, 2021 (JP) ................................. 2021-045812

(51) Int. Cl.
*H02K 1/18* (2006.01)
*F16C 32/04* (2006.01)
(Continued)

(52) U.S. Cl.
CPC ......... *H02K 1/185* (2013.01); *F16C 32/0474* (2013.01); *F25B 31/02* (2013.01); *H02K 7/09* (2013.01)

(58) Field of Classification Search
CPC .......... H02K 1/185; H02K 7/09; H02K 15/02; F16C 32/0474; F25B 31/02; F04D 25/0606; F04D 29/058; F04D 29/624
(Continued)

(56) References Cited

U.S. PATENT DOCUMENTS 4,652,782 A * 3/1987 Rossie ................... H02K 1/185
310/216.052
4,881,001 A * 11/1989 Patel ...................... H02K 1/185
310/216.052
(Continued)

FOREIGN PATENT DOCUMENTS

JP      2008005580 A * 1/2008
JP      2015-208164 A    11/2015
(Continued)

OTHER PUBLICATIONS

International Search Report of corresponding PCT Application No. PCT/JP2022/004316 dated Apr. 12, 2022.
(Continued)

*Primary Examiner* — Ahmed Elnakib
(74) *Attorney, Agent, or Firm* — Spencer Fane LLP

(57) ABSTRACT

A stator-core fixing structure fixes a stator core to a housing. The stator-core fixing structure includes a plurality of outer peripheral surface portions, and a plurality of inner peripheral surface portions. The plurality of outer peripheral surface portions are included in an outer peripheral surface of the stator core and have outer diameters different from each other. The plurality of inner peripheral surface portions are included in an inner peripheral surface of the housing and have inner diameters different from each other. Each of the plurality of outer peripheral surface portions corresponds to a corresponding one of the plurality of inner peripheral surface portions. Each of the plurality of outer peripheral
(Continued)

surface portions contacts the corresponding one of the plurality of inner peripheral surface portions.

17 Claims, 11 Drawing Sheets

(51) Int. Cl.
    *F25B 31/02*        (2006.01)
    *H02K 7/09*        (2006.01)
(58) Field of Classification Search
    USPC ............................................ 310/89, 90, 90.5
    See application file for complete search history.

(56)                References Cited

U.S. PATENT DOCUMENTS

| | | | | |
|---|---|---|---|---|
| 2007/0120436 | A1* | 5/2007 | Kawasaki | H02K 11/21 |
| | | | | 310/216.057 |
| 2013/0343927 | A1* | 12/2013 | Ramdane | F04D 29/058 |
| | | | | 417/365 |
| 2016/0258321 | A1 | 9/2016 | Thompson et al. | |

| | | | | |
|---|---|---|---|---|
| 2017/0040864 | A1 | 2/2017 | Takabe | |
| 2017/0292524 | A1 | 10/2017 | Huscher et al. | |
| 2019/0252941 | A1 | 8/2019 | Onishi et al. | |
| 2020/0350804 | A1 | 11/2020 | Ono et al. | |
| 2021/0050765 | A1 | 2/2021 | Ono et al. | |
| 2021/0115929 | A1 | 4/2021 | Nakazawa et al. | |

FOREIGN PATENT DOCUMENTS

| | | | | |
|---|---|---|---|---|
| JP | 6062233 | B2 | 12/2016 | |
| JP | 2017-192290 | A | 10/2017 | |
| JP | 2019-49266 | A | 3/2019 | |
| JP | 2019-83654 | A | 5/2019 | |
| JP | 2019-198209 | A | 11/2019 | |
| WO | 2021/099533 | A1 | 5/2021 | |
| WO | WO-2025040415 | A1 * | 2/2025 | ............. H02K 5/203 |

OTHER PUBLICATIONS

European Search Report of corresponding EP Application No. 22 77 0919.3 dated Jul. 17, 2024.
International Preliminary Report of corresponding PCT Application No. PCT/JP2022/004316 dated Sep. 28, 2023.

* cited by examiner

STATOR-CORE FIXING STRUCTURE, MAGNETIC BEARING, ELECTRIC MOTOR, BEARINGLESS MOTOR, CENTRIFUGAL COMPRESSOR, AND FIXING METHOD

CROSS-REFERENCE TO RELATED APPLICATIONS

This is a continuation of International Application No. PCT/JP2022/004316 filed on Feb. 3, 2022, which claims priority to Japanese Patent Application No. 2021-045812, filed on Mar. 19, 2021. The entire disclosures of these applications are incorporated by reference herein.

BACKGROUND

Technical Field

The present disclosure relates to a stator-core fixing structure, a magnetic bearing, an electric motor, a bearingless motor, a centrifugal compressor, and a fixing method.

Background Art

The electric motor described in Japanese Patent No. 6062233 includes a housing, a stator core that is held by the housing and that has an iron core in which a plurality of magnetic steel plates are laminated, and a rotor that is disposed on an inner side of the stator core and that is supported so as to be rotatable about a rotation axis with respect to the housing.

SUMMARY

A first aspect of the present disclosure is directed to a stator-core fixing structure that is a fixing structure of a stator core fixed to a housing. The stator-core fixing structure includes a plurality of outer peripheral surface portions, and a plurality of inner peripheral surface portions. The plurality of outer peripheral surface portions are included in an outer peripheral surface of the stator core and have outer diameters different from each other. The plurality of inner peripheral surface portions are included in an inner peripheral surface of the housing and have inner diameters different from each other. Each of the plurality of outer peripheral surface portions corresponds to a corresponding one of the plurality of inner peripheral surface portions. Each of the plurality of outer peripheral surface portions contacts the corresponding one of the plurality of inner peripheral surface portions.

DETAILED DESCRIPTION OF EMBODIMENT(S)

Figure 1:
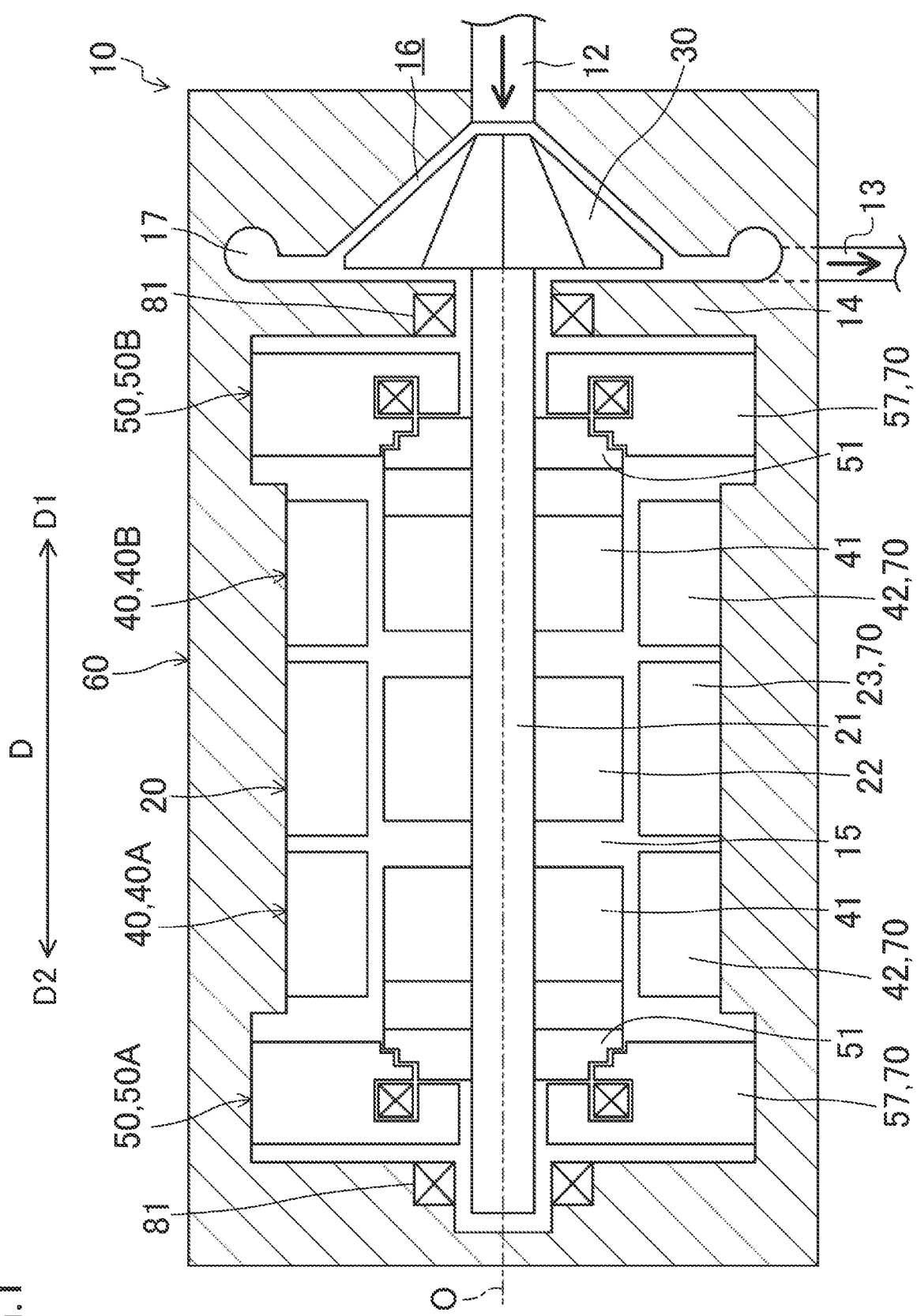
FIG. 1 is a sectional end view of a centrifugal compressor according to a first embodiment of the present invention.

Embodiments of the present invention will be described with reference to the drawings. In the drawings, the same or corresponding portions are denoted by the same reference numerals, and detailed descriptions and descriptions of effects and the like associated therewith will not be repeated.

A centrifugal compressor (10) according to a first embodiment of the present invention will be described with reference to FIG. 1. FIG. 1 is a sectional end view of the centrifugal compressor (10) according to the first embodiment of the present invention.

Overall Configuration

As shown in FIG. 1, the centrifugal compressor (10) includes an electric motor (20), an impeller (30), a radial magnetic bearing (40), a thrust magnetic bearing (50), touchdown bearings (81), and a housing (60). Each of the radial magnetic bearing (40) and the thrust magnetic bearing (50) is an example of a magnetic bearing of the present invention.

The housing (60) has a hollow shape. The housing (60) is formed in a cylindrical shape with both ends closed, and is disposed such that a cylinder axis is oriented horizontally. A space in the housing (60) is partitioned by a wall portion (14). A space behind the wall portion (14) is a drive mechanism space (15) for accommodating the electric motor (20), the radial magnetic bearing (40), and the thrust magnetic bearing (50). A space in front of the wall portion (14) is an impeller space (16) for accommodating the impeller (30).

The electric motor (20) includes a drive shaft (21), a rotor (22), and a stator core (23). The rotor (22) is fixed to the drive shaft (21) so as to be coaxial with the drive shaft (21). The rotor (22) is disposed such that an outer peripheral surface of the rotor (22) faces an inner peripheral surface of the stator core (23) with a predetermined distance therebetween. The stator core (23) is fixed to an inner peripheral surface of the housing (60). Each of the rotor (22) and the stator core (23) is formed in an annular shape around an axis (O) of the drive shaft (21). In this example, the electric motor (20) is a so-called permanent magnet synchronous motor. The electric motor (20) is accommodated in the drive mechanism space (15) such that the direction of the axis (O) of the drive shaft (21) is horizontal. The electric motor (20) may be a bearingless motor.

The impeller (30) is formed to have a substantially conical outer shape by a plurality of blades. The impeller (30) is accommodated in the impeller space (16) in a state of being fixed to one end portion (in this example, a front end portion) of the drive shaft (21). A suction pipe (12) and a discharge pipe (13) are connected to the impeller space (16). A compression space (17) is formed in an outer peripheral portion of the impeller space (16). The suction pipe (12) is provided to introduce gas from the outside into the impeller space (16). The discharge pipe (13) is provided to return high-pressure gas compressed in the impeller space (16) to the outside.

The radial magnetic bearing (40) is configured to support the drive shaft (21) in a non-contact manner by an electromagnetic force. The radial magnetic bearing (40) includes a rotor (41) fixed to the drive shaft (21), and a stator core (42) disposed at a predetermined distance from the rotor (41). Each of the rotor (41) and the stator core (42) is formed in an annular shape around the axis (O) of the drive shaft (21). The stator core (42) is fixed to the inner peripheral surface of the housing (60).

The thrust magnetic bearing (50) is configured to control an axial position of the drive shaft (21) in a non-contact manner by an electromagnetic force. The thrust magnetic bearing (50) includes a rotor (51) fixed to the drive shaft (21), and a stator core (57) disposed at a predetermined distance from the rotor (51). Each of the rotor (51) and the stator core (57) is formed in an annular shape around the axis (O) of the drive shaft (21). The stator core (57) is fixed to an inner peripheral surface of the housing (60).

The touchdown bearings (81) are provided to prevent contact between the stator core (42) and the rotor (41) in the radial magnetic bearing (40), and contact between the stator core (57) and the rotor (51) in the thrust magnetic bearing (50). In this example, one touchdown bearing (81) each is provided on the wall portion (14) that partitions the impeller space (16) and the drive mechanism space (15) and on the thrust magnetic bearing (50) on a rear side. However, the number and arrangement of the touchdown bearings (81) are not limited thereto. For example, each touchdown bearing (81) can be constituted by an angular ball bearing.

The operation of the centrifugal compressor (10) will be described. When electric power is supplied to the electric motor (20), the rotor (22) of the electric motor (20) rotates, whereby the drive shaft (21) and the impeller (30) rotate. When the impeller (30) rotates, gas is sucked from the suction pipe (12) into the impeller space (16) and compressed. The compressed gas passes through the discharge pipe (13) and is discharged from the impeller space (16).

Hereinafter, at least one of the stator core (23) of the electric motor (20), the stator core (42) of the radial magnetic bearing (40), and the stator core (57) of the thrust magnetic bearing (50) shown in FIG. 1 may be referred to as a stator core (70).

The centrifugal compressor (10) includes a stator-core-70 fixing structure. The stator-core-(70) fixing structure is a structure of the stator core (70) and the housing (60) for fixing the stator core (70) to the housing (60). The stator core (70) is fixed to the housing (60) by, for example, interference fitting. The interference fitting indicates that the stator core (70) is fixed to the housing (60) by pressure from the housing (60), fastening, or the like, such as press fitting and shrink fitting.

First Embodiment of Stator-Core Fixing Structure

Figure 2:
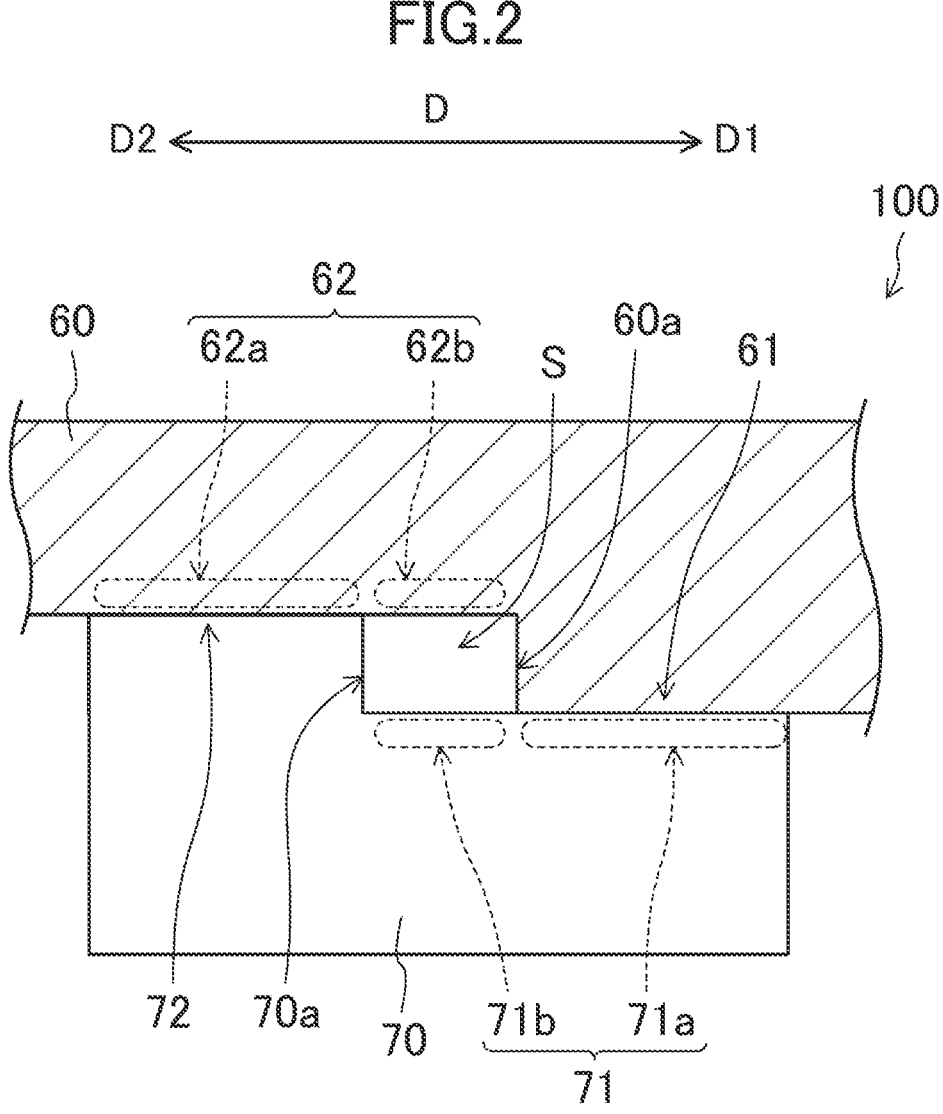
FIG. 2 is a sectional end view showing the first embodiment of the stator-core fixing structure.

A stator-core-(70) fixing structure (100), which is the first embodiment of a fixing structure of the stator core (70), will be described with reference to FIGS. 1 and 2. FIG. 2 is a sectional end view of the stator-core-(70) fixing structure (100).

In FIGS. 1 to 11, arrow D indicates an axial direction (D) of the stator core (70). The axial direction (D) of the stator core (70) is a direction parallel to the direction in which the axis (O) (see FIG. 1) of the drive shaft (21) extends. As shown in FIG. 1, five stator cores (70) are provided inside the housing (60). The five stator cores (70) are arranged along the axial direction (D).

FIG. 1 shows, for each stator core (70), a pair of sectional end views arranged one above the other about the drive shaft (21). In FIGS. 2 to 9, an upper sectional end view of the pair of sectional end views of the stator core (70) shown in FIG. 1 is shown, and a lower sectional end view is not shown. Note that, in FIGS. 2 to 9, the lower sectional end view of the stator core (70), which is not shown, has a shape obtained by vertically inverting the upper sectional end view that is shown. Note that, in FIGS. 2 to 9, similarly to the stator core (70), an upper sectional end view of the housing (60) is shown, and a lower sectional end view (obtained by vertically inverting the upper sectional end view) is not shown.

As shown in FIG. 2, the stator-core-(70) fixing structure (100) includes a plurality of outer peripheral surface portions, a plurality of inner peripheral surface portions, a stator core step portion (70a), and a housing step portion (60a).

The plurality of outer peripheral surface portions are formed on an outer peripheral surface of the stator core (70). In the first embodiment, the plurality of outer peripheral surface portions include a first outer peripheral surface portion (71) and a second outer peripheral surface portion (72). Each of the plurality of outer peripheral surface portions constitutes a part of the outer peripheral surface of the stator core (70) and is formed into an annular shape around the axis (O) of the drive shaft (21) (see FIG. 1).

The plurality of outer peripheral surface portions of the stator core (70) are arranged such that outer diameters thereof decrease in order toward one direction side (D1), a first direction side, in the axial direction (D). In the first embodiment, the second outer peripheral surface portion (72) and the first outer peripheral surface portion (71) are arranged in this order toward the one direction side (D1) in the axial direction (D). The outer diameter of the first outer peripheral surface portion (71) is smaller than the outer diameter of the second outer peripheral surface portion (72).

The one direction side (D1) in the axial direction (D) is an insertion (press-fitting) direction of the stator core (70) into the housing (60) when the stator core (70) is fixed to the housing (60).

The stator core step portion (70a) is formed on the outer peripheral surface of the stator core (70). The stator core step portion (70a) indicates a portion inclined with respect to the axial direction (D) on the outer peripheral surface of the stator core (70). In the first embodiment, the stator core step portion 70a has a shape in which the outer peripheral surface of the stator core 70 is inclined substantially perpendicularly to the axial direction D. The stator core step portion (70a) is positioned between adjacent outer peripheral surface portions among the plurality of outer peripheral surface portions of the stator core (70). In the first embodiment, the stator core step portion (70a) is positioned between the first outer peripheral surface portion (71) and the second outer peripheral surface portion (72).

The plurality of inner peripheral surface portions are formed on the inner peripheral surface of the housing (60). In the first embodiment, the plurality of inner peripheral surface portions include a first inner peripheral surface portion (61) and a second inner peripheral surface portion (62). Each of the plurality of inner peripheral surface portions constitutes a part of the inner peripheral surface of the housing (60), and is formed into an annular shape around the axis (O) of the drive shaft (21) (see FIG. 1). The plurality of inner peripheral surface portions have inner diameters different from each other, and positions in the axial direction (D) are different from each other.

The plurality of inner peripheral surface portions of the housing (60) are arranged such that inner diameters thereof decrease in order toward the one direction side (D1) in the axial direction (D). In the first embodiment, the second inner peripheral surface portion (62) and the first inner peripheral surface portion (61) are arranged in this order toward the one side direction (D1) in the axial direction (D). The inner diameter of the first inner peripheral surface portion (61) is smaller than the inner diameter of the second inner peripheral surface portion (62).

The housing step portion (60a) is formed on the inner peripheral surface of the housing (60). The housing step portion (60a) is a portion inclined with respect to the axial direction (D) on the inner peripheral surface of the housing (60). In the first embodiment, the housing step portion 60a has a shape in which the inner peripheral surface of the housing 60 is inclined substantially perpendicularly to the axial direction (D). The housing step portion (60a) is positioned between adjacent inner peripheral surface portions among the plurality of inner peripheral surface portions of the housing (60). In the first embodiment, the housing step portion (60a) is positioned between the first inner peripheral surface portion (61) and the second inner peripheral surface portion (62). The housing step portion (60a) faces the stator core step portion (70a) in the axial direction.

The plurality of outer peripheral surface portions of the stator core (70) each correspond to a corresponding one of the plurality of inner peripheral surface portions of the housing (60). Each of the plurality of outer peripheral surface portions of the stator core (70) contacts the corresponding one of the plurality of inner peripheral surface portions of the housing (60). In the first embodiment, the first outer peripheral surface portion (71) corresponds to the first inner peripheral surface portion (61), and the second outer peripheral surface portion (72) corresponds to the second inner peripheral surface portion (62). The first outer peripheral surface portion (71) contacts the first inner peripheral surface portion (61), and the second outer peripheral surface portion (72) contacts the second inner peripheral surface portion (62).

In the axial direction (D) of the stator core (70), the position of the stator core step portion (70a) is different from the position of the housing step portion (60a). In the first embodiment, the housing step portion (60a) is positioned on the one direction side (D1) in the axial direction (D) of the stator core step portion (70a). A space (S) is formed between the stator core step portion (70a) and the housing step portion (60a). One part (71a) of the first outer peripheral surface portion (71) contacts the first inner peripheral surface portion (61), and other part (71b) of the first outer peripheral surface portion (71) faces the space (S). One part (62a) of the second inner peripheral surface portion (62) contacts the second outer peripheral surface portion (72), and other part (62b) of the second inner peripheral surface portion (62) faces the space (S).

Effect of First Embodiment

Figure 7A:
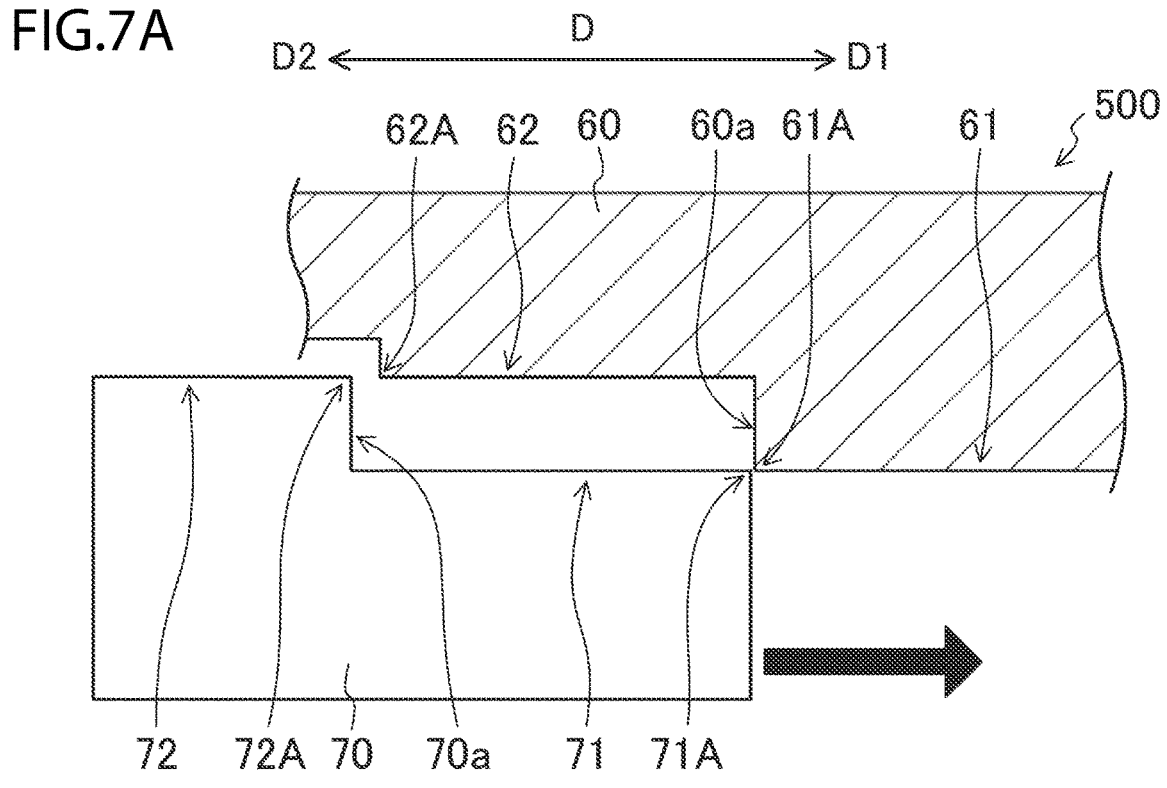
FIG. 7A and FIG. 7B are sectional end views showing an operation of inserting a stator core into a housing.

As described above, each of the plurality of outer peripheral surface portions of the stator core (70) contacts the corresponding one of the plurality of inner peripheral surface portions of the housing (60). As a result, when the stator core (70) is inserted into the housing (60), at an initial stage of moving the stator core (70) into the housing (60) (as shown in FIG. 7A, at a stage in which, at a position in the axial direction (D), a first stator core end portion (71A) of the stator core (70) does not reach the first inner peripheral surface portion (61) of the housing (60) and is positioned between a second housing end portion (62A) and a first housing end portion (61A)), a clearance is formed between the first outer peripheral surface portion (71) of the stator core (70) and the second inner peripheral surface portion (62) of the housing (60). Therefore, the outer peripheral surface of the stator core (70) and the inner peripheral surface of the housing (60) can be more reliably brought into a non-contact state. Further, when the stator core (70) is inserted into the housing (60), the facing time of the stator core (70) and the housing (60) can be reduced. The facing time is a time during which the inner peripheral surface of the housing (60) and the outer peripheral surface of the stator core (70), which contact each other when the housing (60) is cooled and the stator core (70) is fixed, face each other when the stator core (70) is inserted into the housing (60). In the first embodiment, the step structure is provided on each of the inner peripheral surface of the housing (60) and the outer peripheral surface of the stator core (70), whereby, at the initial stage, the first inner peripheral surface portion (61) and the one part (71a) of the first outer peripheral surface portion (71), which contact each other at the time of fixing, do not face each other (to be more specific, the one part (71a) of the first outer peripheral surface portion (71) faces the second inner peripheral surface portion (62)), and, from a stage subsequent to the initial stage, they face each other. Therefore, the facing time of the first inner peripheral surface portion (61) and the one part (71a) of the first outer peripheral surface portion (71) can be reduced. According to this, when the stator core (70) is fixed to the housing (60) by shrink fitting, it is not necessary to thermally expand the housing (60) at the initial stage of moving the stator core (70) into the housing (60) (the stage before the facing time), so that the time in which the housing (60) must be thermally expanded can be shortened. As a result, during the operation of inserting the stator core (70) into the housing (60), it is possible to prevent the stator core (70) from being caught by the inner peripheral surface of the housing (60) when contraction of the thermally expanded housing to its original shape occurs due to a temperature drop or the like with the passage of time. As a result, it is possible to improve the workability of the fixing work of fixing the stator core (70) to the housing (60).

Further, when the stator core (70) is inserted into the housing (60), the stator core (70) can be inserted into the housing (60) while suppressing the inclination of the stator core (70) with respect to the housing (60) by bringing the first outer peripheral surface portion (71) of the stator core (70) into contact with the first inner peripheral surface portion (61) of the housing (60). As a result, since the stator core (70) can be stably inserted into the housing (60), it is possible to improve the workability of the fixing work of fixing the stator core (70) to the housing (60).

Further, in the axial direction (D) of the stator core (70), the position of the stator core step portion (70a) is different from the position of the housing step portion (60a). Thus, the space (S) is formed between the stator core (70) and the housing (60), and the contact area between the stator core (70) and the housing (60) can be reduced. According to this, when the stator core (70) is inserted into the housing (60) in order to fix the stator core (70) to the housing (60), it is possible to reduce the pressure that the stator core (70) receives from the housing (60).

Second Embodiment of Stator-Core Fixing Structure

Figure 3:
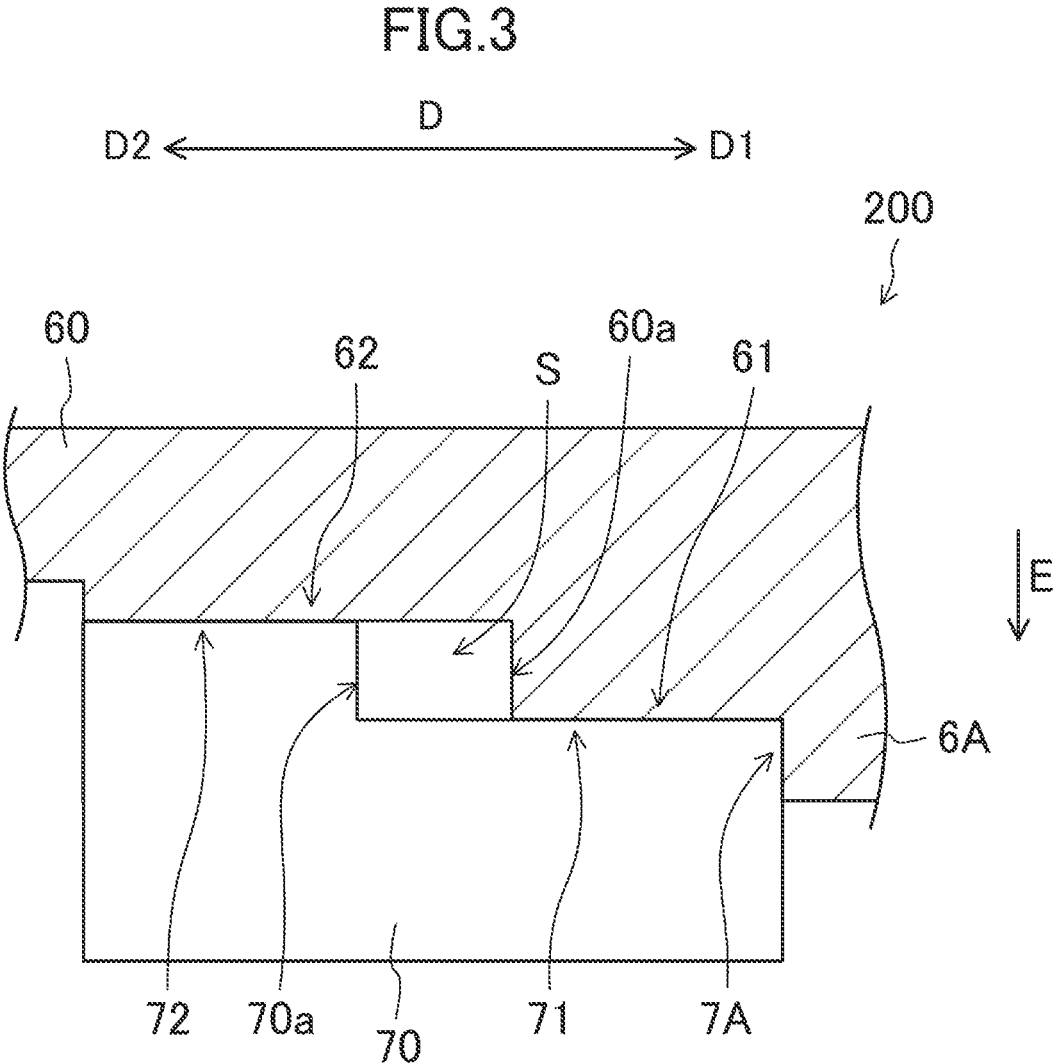
FIG. 3 is a sectional end view showing a second embodiment of a stator-core fixing structure.

A stator-core-(70) fixing structure (200), which is a second embodiment of a fixing structure of a stator core (70), will be described with reference to FIG. 3. FIG. 3 is a sectional end view of the stator-core-(70) fixing structure (200).

As shown in FIG. 3, the stator-core-(70) fixing structure (200) further includes a protrusion (6A). The protrusion (6A) is formed on an inner peripheral surface of a housing (60) and protrudes toward an inner side of the housing (60). The protrusion (6A) faces, in an axial direction (D) of the stator core (70), an end portion (7A) of the stator core (70) on one direction side (D1) in the axial direction (D). The protrusion (6A) contacts the end portion (7A) of the stator core (70) from the one direction side (D1) in the axial direction (D).

Effect of Second Embodiment

As described above, the protrusion (6A) is formed on the inner peripheral surface of the housing (60). Thus, when the stator core (70) is inserted into the housing (60), the stator core (70) contacts the protrusion (6A), so that a worker can easily confirm that the insertion work has been completed. As a result, it is possible to improve the workability of the fixing work of fixing the stator core (70) to the housing (60).

Third Embodiment of Stator-Core Fixing Structure

Figure 4A:
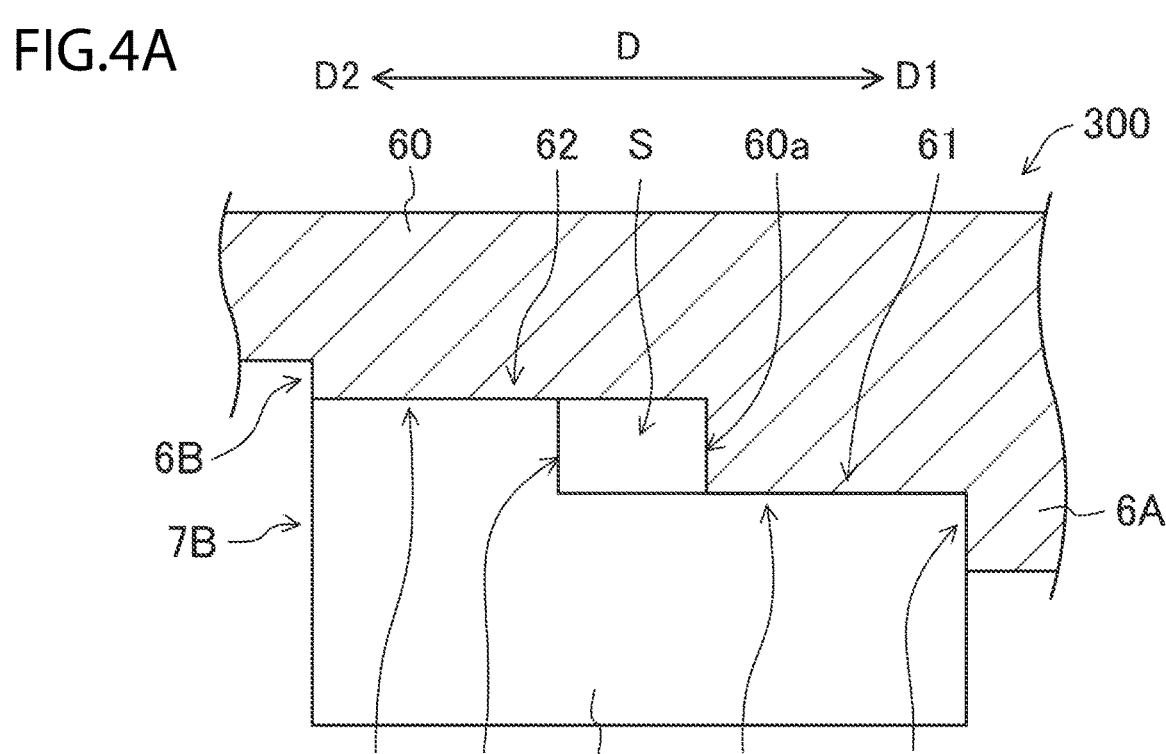
FIG. 4A is a sectional end view showing a third embodiment of a stator-core fixing structure.

A stator-core-(70) fixing structure (300), which is a third embodiment of a fixing structure of a stator core (70), will be described with reference to FIG. 4A. FIG. 4A is a sectional end view of the stator-core-(70) fixing structure (300).

As shown in FIG. 4A, the stator-core-(70) fixing structure (200) includes an end surface (7B) of a stator core (70) and an end surface (6B) of a housing (60). The end surface (7B) of the stator core (70) is an end surface that is formed on another direction side (D2), a second direction side, in an axial direction (D) of the stator core (70). The end surface (6B) of the housing (60) is a surface of the housing (60) that is positioned at an outer peripheral portion of the end surface (6B) of the housing (60) and that faces the other direction side (D2) in the axial direction (D).

With regard to positions in the axial direction (D), the end surface (7B) of the stator core (70) and the end surface (6B) of the housing (60) are the same.

Effect of Third Embodiment

When a worker inserts the stator core (70) into the housing (60), if the worker visually confirms that the end surface (7B) of the stator core (70) and the end surface (6B) of the housing (60) are the same with regard to the positions in the axial direction (D), the worker can determine that the insertion operation of the stator core (70) is completed. As a result, the worker can easily determine whether or not the insertion operation of the stator core (70) has been completed.

Modification of Third Embodiment of Stator-Core Fixing Structure

Figure 4B:
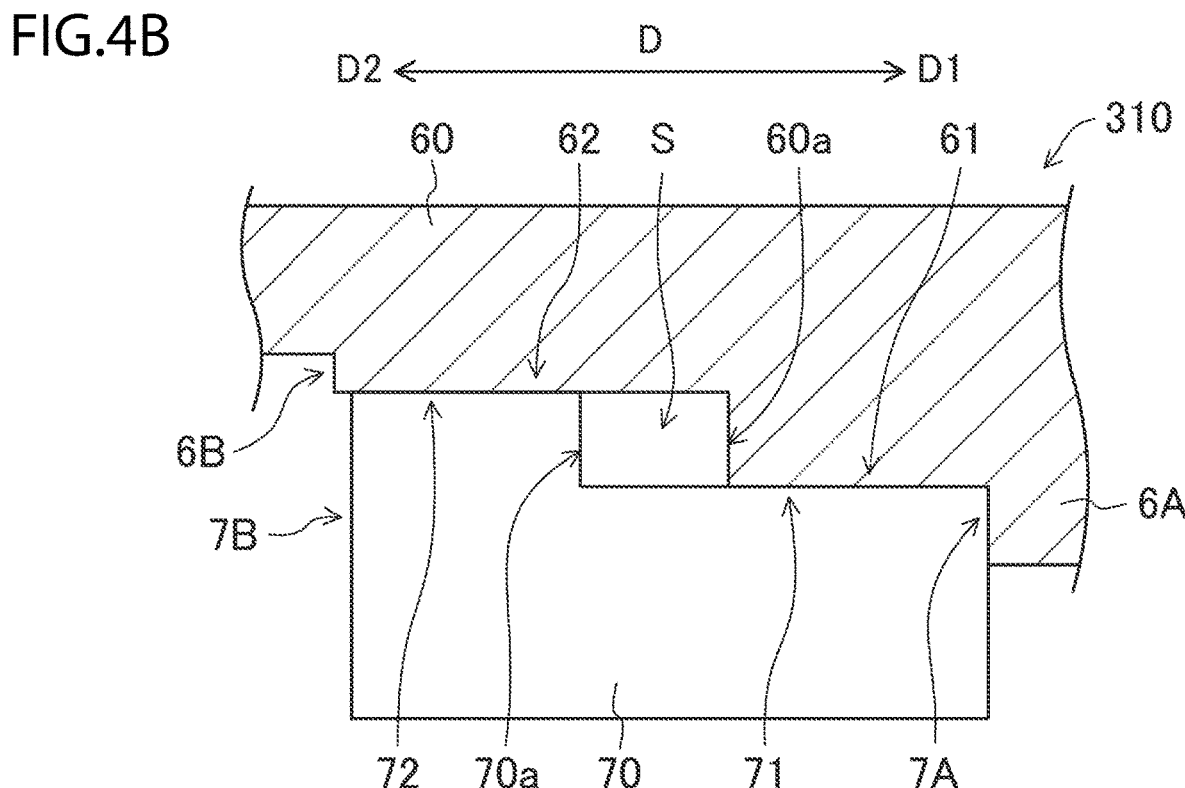
FIG. 4B is a sectional end view showing a modification of the third embodiment of the stator-core fixing structure.

A stator-core-(70) fixing structure (310), which is a modification of the third embodiment of the fixing structure of the stator core (70), will be described with reference to FIG. 4B. FIG. 4B is a sectional end view of the stator-core-(70) fixing structure (310).

As shown in FIG. 4B, in the stator-core-(70) fixing structure (310), with regard to positions in the axial direction (D), the end surface (7B) of the stator core (70) is positioned further toward an inward side (one direction side (D1) in the axial direction (D)) of the housing (60) than the end surface (6B) of the housing (60).

Effect of Modification of Third Embodiment

When the stator core (70) is inserted into the housing (60), if a worker visually confirms that the end surface (7B) of the stator core (70) is positioned further toward the inward side of the housing (60) than the end surface (6B) of the housing (60), the worker can determine that the insertion operation of the stator core (70) has been completed. As a result, the worker can easily determine whether or not the insertion operation of the stator core (70) has been completed.

Fourth Embodiment of Stator-Core Fixing Structure

Figure 5:
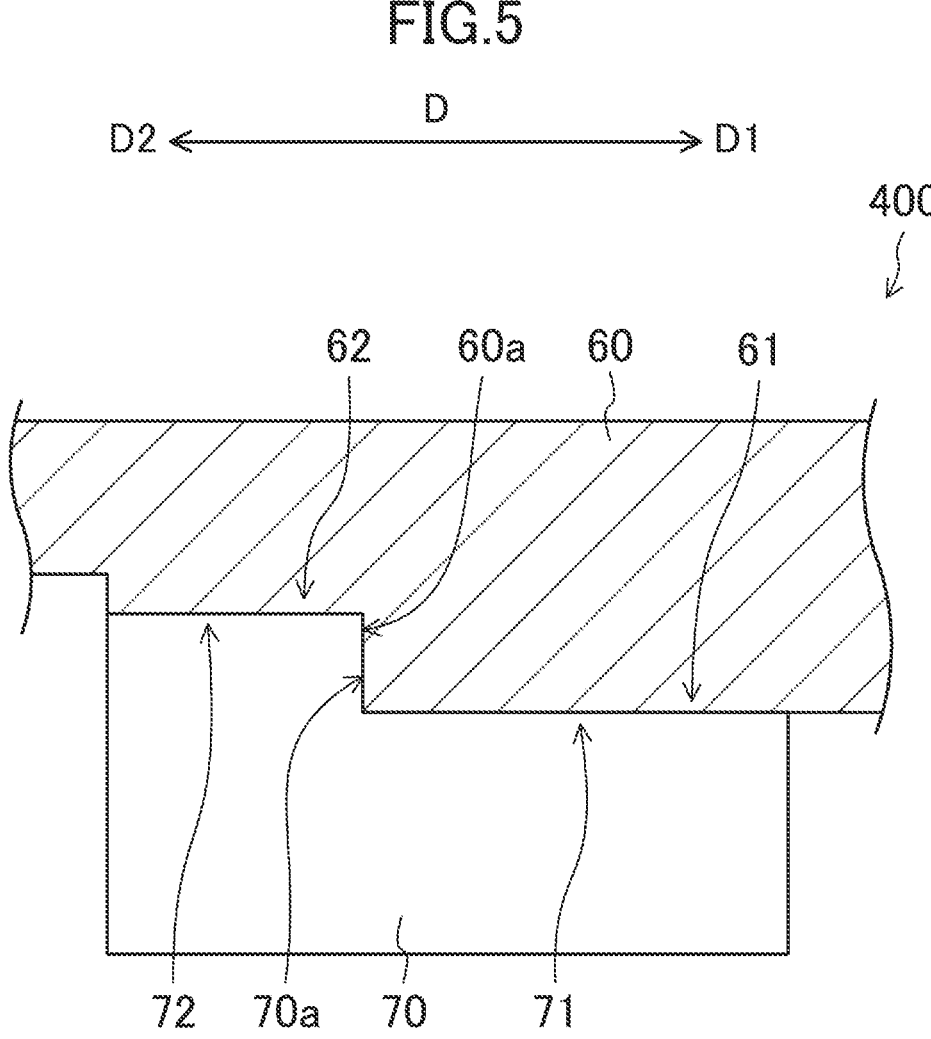
FIG. 5 is a sectional end view showing a fourth embodiment of a stator-core fixing structure.

A stator-core-(70) fixing structure (400), which is a fourth embodiment of a fixing structure of a stator core (70), will be described with reference to FIG. 5. FIG. 5 is a sectional end view of the stator-core-(70) fixing structure (400).

As shown in FIG. 5, a stator core step portion (70*a*) and a housing step portion (60*a*) contact each other. In other words, the space (S) (see FIG. 2) is not formed between the stator core step portion (70*a*) and the housing step portion (60*a*).

Effect of Fourth Embodiment

As described above, the stator core step portion (70*a*) and the housing step portion (60*a*) contact each other. Thus, the contact area between a stator core (70) and a housing (60) is increased, and the stator core (70) can be more effectively held by the housing (60).

Fifth Embodiment of Stator-Core Fixing Structure

Figure 6:
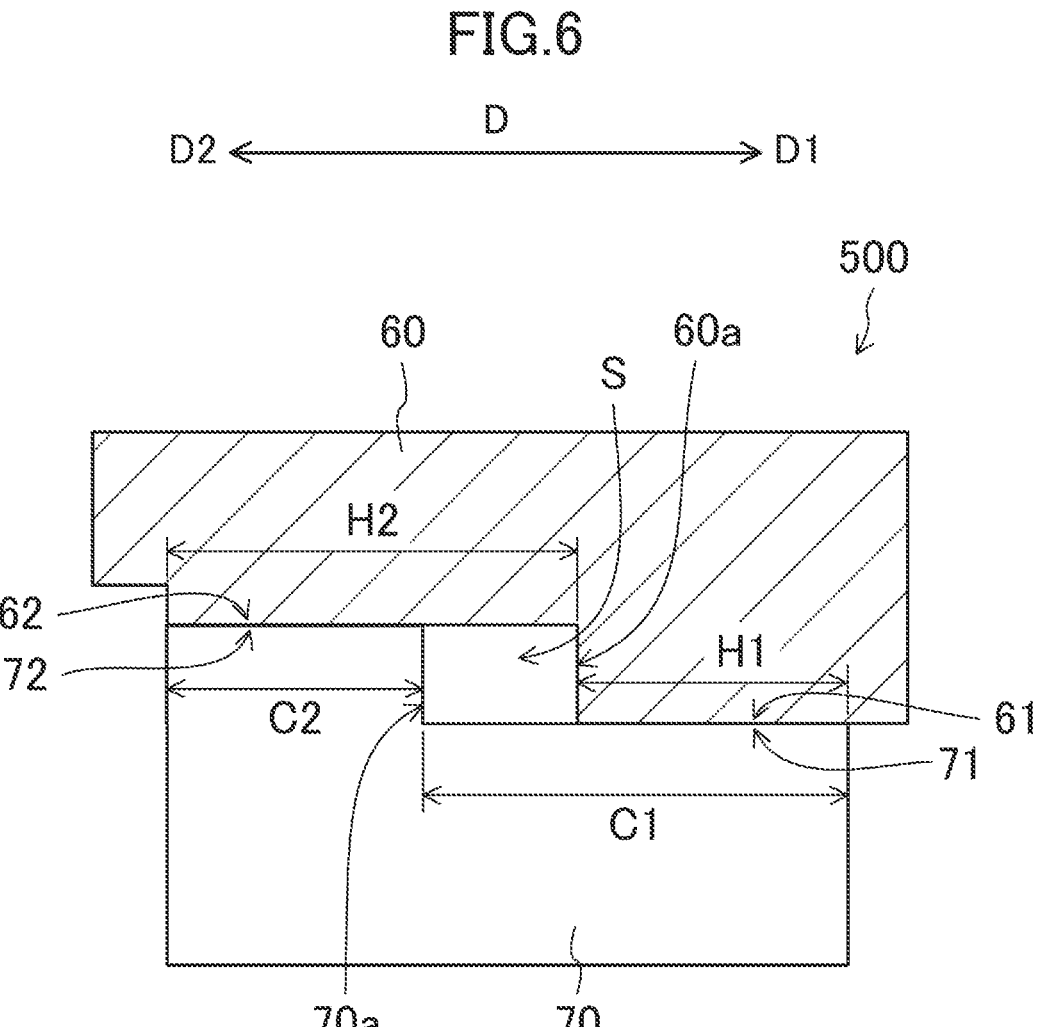
FIG. 6 is a sectional end view showing a fifth embodiment of a stator-core fixing structure.
Figure 7B:
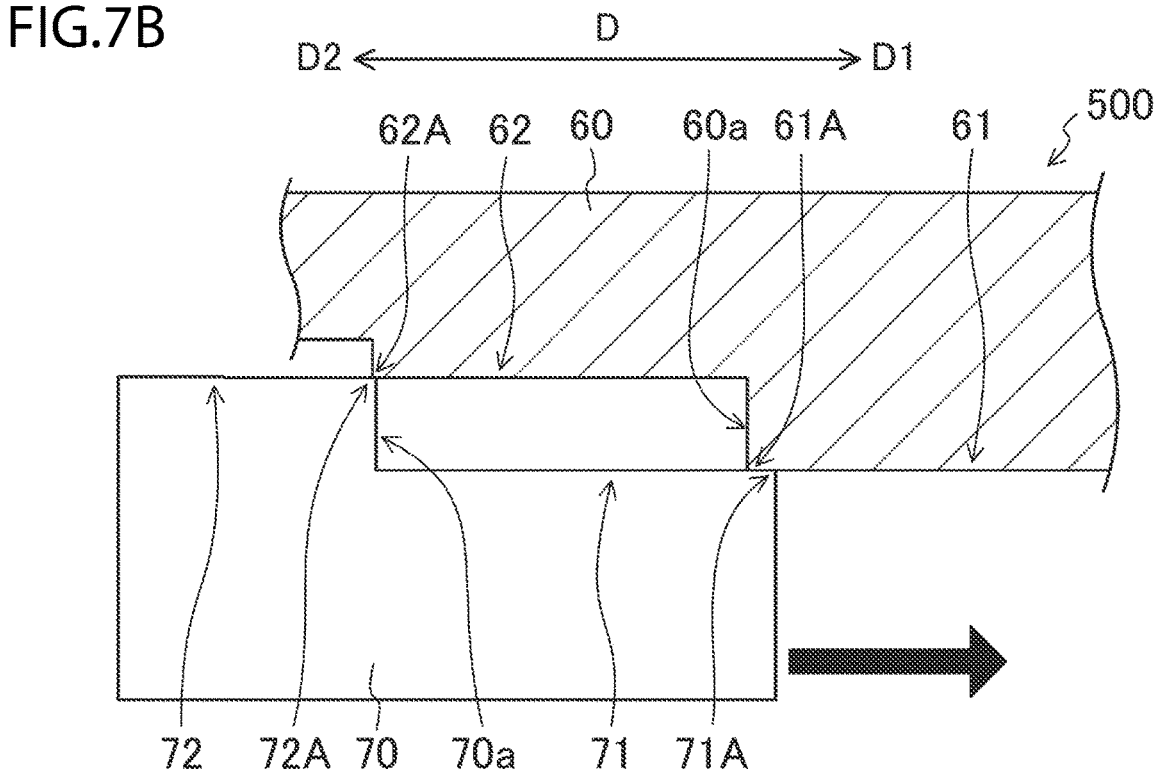

A stator-core-(70) fixing structure (500), which is a fifth embodiment of a fixing structure of a stator core (70), will be described with reference to FIGS. 6 to 7B. FIG. 6 is a sectional end view of the stator-core-(70) fixing structure (500). FIGS. 7A and 7B are views showing a procedure of inserting the stator core (70) into the housing (60).

In FIG. 6, a size C1 is the size of a first outer peripheral surface portion (71) in an axial direction (D), a size C2 is the size of a second outer peripheral surface portion (72) in the axial direction (D), a size H1 is the size of a first inner peripheral surface portion (61) in the axial direction (D), and a size H2 is the size of a second inner peripheral surface portion (62) in the axial direction (D).

In FIGS. 7A and 7B, the first stator core end portion (71A) is an end portion of the first outer peripheral surface portion (71) of the stator core (70) on one direction side (D1) in the axial direction (D). A second stator core end portion (72A) is an end portion of the second outer peripheral surface portion (72) of the stator core (70) on the one direction side (D1) in the axial direction (D). The first housing end portion (61A) is an end portion of the first inner peripheral surface portion (61) of the housing (60) on another direction side (D2) in the axial direction (D). A second housing end portion (62A) is an end portion of the second inner peripheral surface portion (62) of the housing (60) on the other direction side (D2) in the axial direction (D).

Effect of Fifth Embodiment

As shown in FIG. 6, C1>H2 is satisfied in the stator-core-(70) fixing structure (500). Thus, as shown in FIGS. 7A and 7B, when the stator core (70) is fixed to the housing (60), in moving the stator core (70) toward the one direction side (D1) in the axial direction (D) to insert the stator core (70) into the housing (60), first, the first stator core end portion (71A) contacts the first housing end portion (61A), and then the second stator core end portion (72A) contacts the second housing end portion (62A). Thus, when the stator core (70) is inserted into the housing (60), the stator core (70) can be stably inserted into the housing (60) in a state in which the first stator core end portion (71A) is brought into contact with the first housing end portion (61A) to suppress the inclination of the stator core (70) with respect to the housing (60).

Sixth Embodiment of Stator-Core Fixing Structure

Figure 8:
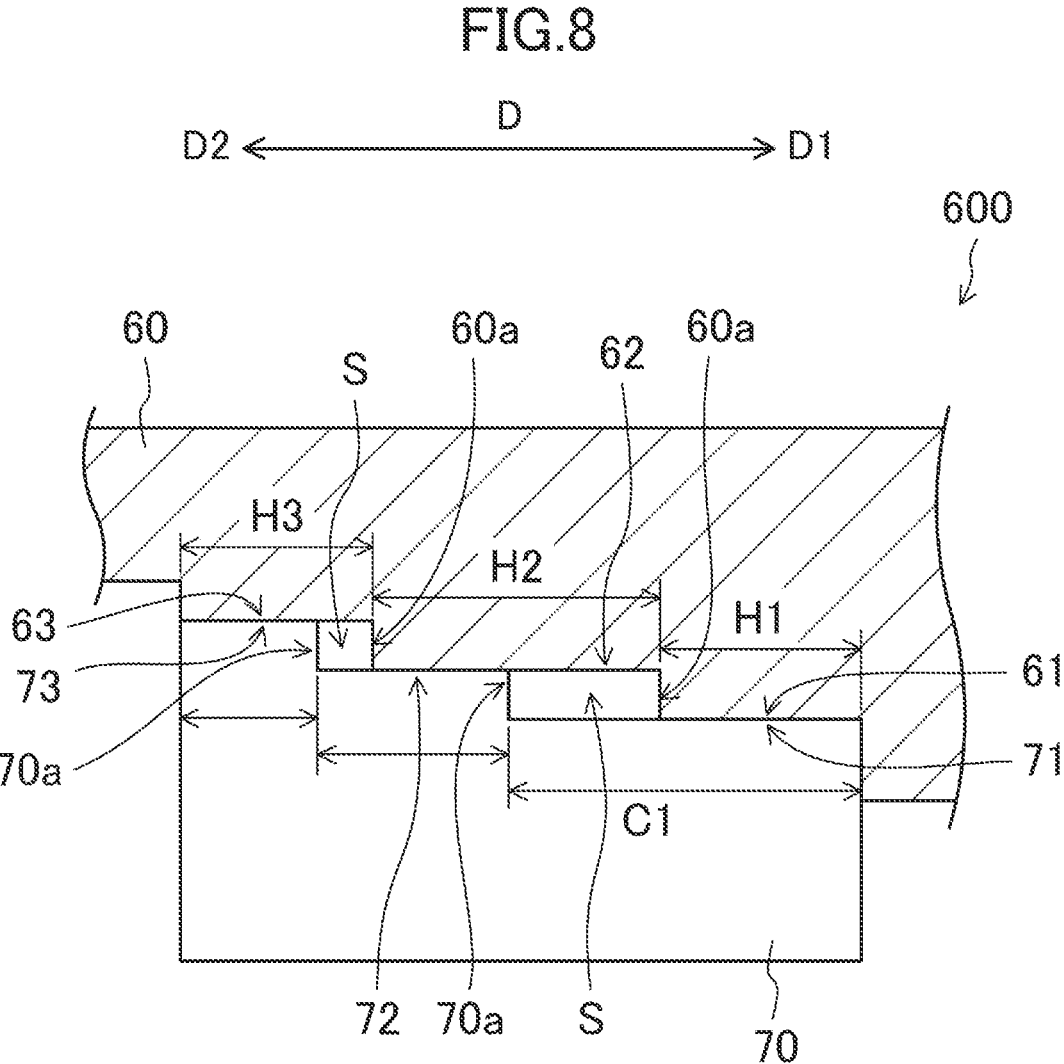
FIG. 8 is a sectional end view showing a sixth embodiment of a stator-core fixing structure.

A stator-core-(70) fixing structure (600), which is a sixth embodiment of a fixing structure of a stator core (70), will be described with reference to FIG. 8. FIG. 8 is a sectional end view of the stator-core-(70) fixing structure (600).

As shown in FIG. 8, a plurality of outer peripheral surface portions of a stator core (70) include a first outer peripheral surface portion (71) to an M-th outer peripheral surface portion (M is an integer of 2 or more). Note that, in the sixth embodiment, M=3 and the plurality of outer peripheral surface portions include the first outer peripheral surface portion (71) to a third outer peripheral surface portion (73). The first outer peripheral surface portion (71) to the M-th outer peripheral surface portion are arranged in the order of the first outer peripheral surface portion (71) to the M-th outer peripheral surface portion toward another direction side (D2) in an axial direction (D). An n-th outer peripheral surface portion (n is an integer of 1 or more and M or less) of the stator core (70) has a length of Hn in the axial direction (D) of the stator core (70). The outer diameter of the n-th outer peripheral surface portion is larger than the outer diameter of an (n−1)-th outer peripheral surface portion.

A plurality of inner peripheral surface portions of the housing (60) include a first inner peripheral surface portion (61) to an M-th inner peripheral surface portion. In the sixth embodiment, M=3 and the plurality of inner peripheral surface portions include the first inner peripheral surface portion (61) to a third inner peripheral surface portion (63). The first inner peripheral surface portion (61) to the M-th inner peripheral surface portion are arranged in the order of the first inner peripheral surface portion (61) to the M-th inner peripheral surface portion toward the other direction side (D2) in the axial direction (D). An n-th inner peripheral surface portion of the housing (60) has a length of Cn in the axial direction (D) of the stator core (70). The inner diameter of the n-th inner peripheral surface portion is larger than the inner diameter of an (n−1)-th inner peripheral surface portion. The n-th inner peripheral surface portion of the housing (60) contacts the n-th outer peripheral surface portion of the stator core (70).

In the stator-core-(70) fixing structure (600), C1>H2, C1+C2>H2+H3, and $\Sigma(i=1, 2, \ldots, n-1)Ci>\Sigma(i=1, 2, \ldots, n)Hi$ are satisfied.

Effect of Sixth Embodiment

Due to such a structure above, at an initial stage of moving the stator core (70) into the housing (60), the housing (60) and the stator core (70) can be effectively brought into a non-contact state, and, further, when the stator core (70) is inserted into the housing (60), the facing time between an outer peripheral surface of the stator core (70) and an inner peripheral surface of the housing (60), which are brought into contact with each other at the time of fixing, can be effectively reduced, so that the time for thermally expanding the housing (60) can be shortened.

Seventh Embodiment of Stator-Core Fixing Structure

Figure 9:
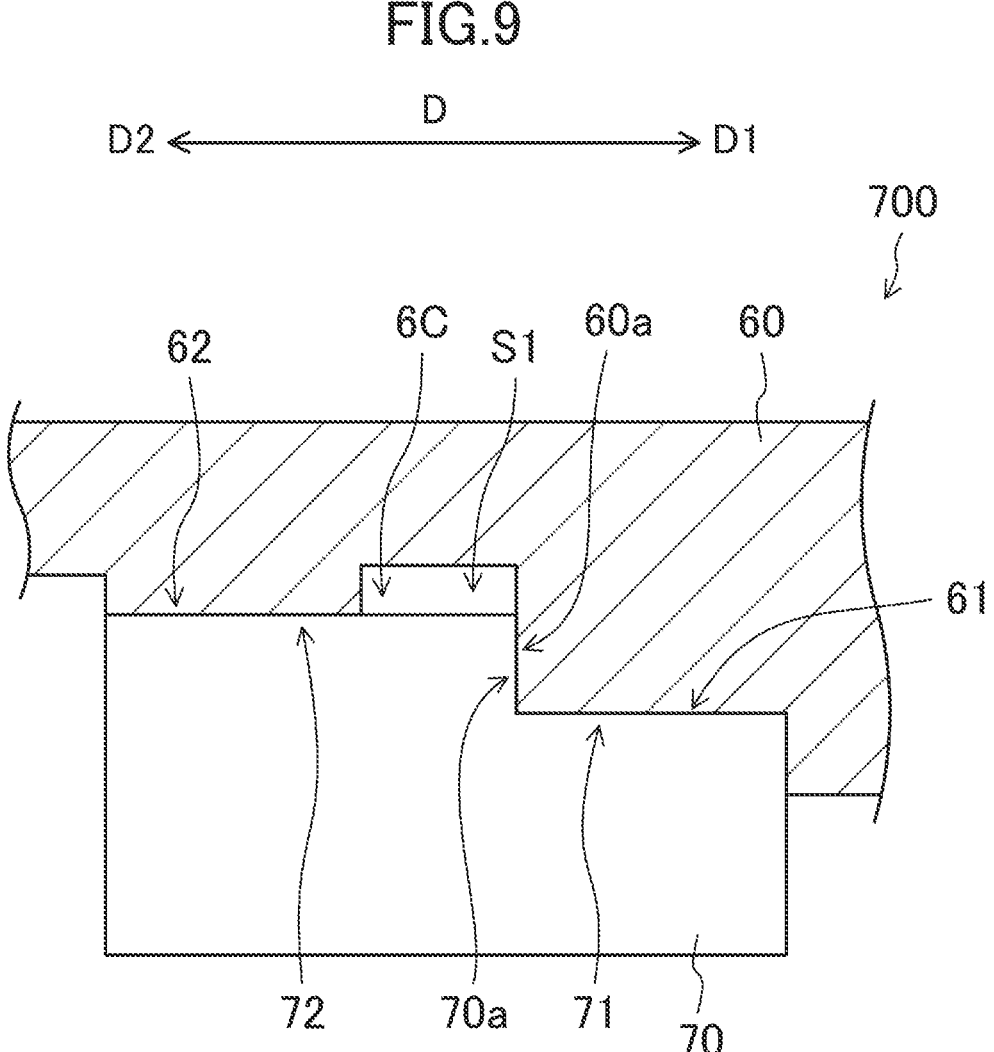
FIG. 9 is a sectional end view showing a seventh embodiment of a stator-core fixing structure.

A stator-core-(70) fixing structure (700), which is a seventh embodiment of a fixing structure of a stator core (70), will be described with reference to FIG. 9. FIG. 9 is a sectional end view of the stator-core-(70) fixing structure (700).

As shown in FIG. 9, the stator-core-(70) fixing structure (700) includes a recessed portion (6C). The recessed portion (6C) is a depressed portion formed in an inner peripheral surface of a housing (60), and does not contact an outer peripheral surface of a stator core (70). A space (51) is formed between the recessed portion (6C) and the outer peripheral surface of the stator core (70). In the seventh embodiment, the recessed portion (6C) is formed in a second outer peripheral surface portion (72) of the housing (60), and a space (S1) is formed between the recessed portion (6C) and the second outer peripheral surface portion (72) of the stator core (70).

A housing step portion (60a) contacts a stator core step portion (70a). Accordingly, the space (S) shown in FIG. 3 is not formed between the housing step portion (60a) and the stator core step portion (70a). However, in the stator-core-(70) fixing structure (700), the recessed portion (6C) is formed in the inner peripheral surface of the housing (60), so that the space (S1) shown in FIG. 9 is formed instead of the space (S) shown in FIG. 3.

Note that, in the stator-core-(70) fixing structure (700) shown in FIG. 9, the housing step portion (60a) and the stator core step portion (70a) may be separated from each other in an axial direction (D) to form both the space (S) shown in FIG. 3 and the space (S1) shown in FIG. 9.

Effect of Seventh Embodiment

As described above, the stator-core-(70) fixing structure (700) includes a recessed portion (6C) that is formed in the inner peripheral surface of the housing (60) and that does not contact the outer peripheral surface of the stator core (70). Thus, the contact area between the stator core (70) and the housing (60) can be reduced. Further, when the stator core (70) is inserted into the housing (60), the facing time between the outer peripheral surface of the stator core (70) and the inner peripheral surface of the housing (60), which are brought into contact with each other at the time of fixing, can be reduced, so that the time for thermally expanding the housing (60) can be shortened.

Although the embodiments and modifications have been described above, it will be understood that various changes in form and detail can be made without departing from the spirit and scope of the claims (for example, the following (1) to (6)). The embodiments and the modifications above may be combined or replaced as appropriate as long as the object functions of the present disclosure are not impaired.

(1) As shown in FIG. 2, with regard to lengths in the axial direction (D), the length of the part (71*a*) of the first outer peripheral surface portion (71) of the stator core (70) and the length of the part (62*a*) of the second inner peripheral surface portion (62) of the housing (60) may be substantially equal to each other. "Substantially equal" means 1 time or more and 1.5 times or less. Thus, when the stator core (70) is inserted into the housing (60), a first state in which the part (71*a*) of the first outer peripheral surface portion (71) and the first inner peripheral surface portion (61) contact each other and a second state in which the second outer peripheral surface portion (72) and the part (62*a*) of the second inner peripheral surface portion (62) contact each other each other can be synchronized with each other. Thus, the time during which the outer peripheral surface of the stator core (70) and the inner peripheral surface of the housing (60), which contact each other at the time of fixing, face each other can be limited to the time during which the first state and the second state are synchronized with each other. This can effectively reduce the time during which the outer peripheral surface of the stator core (70) and the inner peripheral surface of the housing (60) face each other. Note that such a structure described above can be employed not only in the case where each of the outer peripheral surface of the stator core (70) and the inner peripheral surface of the housing (60) has a stepped shape with two steps as shown in FIG. 2, but also in the case where each of the outer peripheral surface of the stator core (70) and the inner peripheral surface of the housing (60) has a stepped shape with three or more steps (see FIG. 8). In this case, the length of a part of the n-th outer peripheral surface portion of the stator core (70) (a portion that contacts the n-th inner peripheral surface) is substantially equal to the length of a part of the (n+1)-th inner peripheral surface portion of the housing (60) (a portion that contacts the (n+1)-th outer peripheral surface portion).

(2) The stator-core-(70) fixing structure (100) to the stator-core-(70) fixing structure (700) (see FIGS. 2 to 9) are used in the centrifugal compressor (10) (turbo compressor). In general, since the centrifugal compressor (10) is larger than other types of compressors, it takes a long time to insert the stator core (70) into the housing (60) when the stator core (70) is fixed to the housing (60). As a result, when the stator core (70) is inserted into the housing (60), in order to, during the movement of the stator core (70) in the housing (60), prevent the housing (60) from contracting and the moving stator core (70) from being caught by the inner peripheral surface of the housing (60), it is necessary to ensure a long time for thermally expanding the housing (60).

However, in the stator-core-(70) fixing structure (100) to the stator-core-(70) fixing structure (700), at the initial stage of moving the stator core (70) into the housing (60), the housing (60) does not contact the stator core (70), and it is not necessary to thermally expand the housing (60). Therefore, it is possible to shorten the time for thermally expanding the housing (60).

Therefore, the structures of the stator-core-(70) fixing structure (100) to the stator-core-(70) fixing structure (700) can be particularly effectively used in the centrifugal compressor (10). Note that the stator-core-(70) fixing structure (100) to the stator-core-(70) fixing structure (700) may be used in a compressor (a positive displacement compressor or the like) of a type other than the centrifugal compressor (10).

Figure 10:
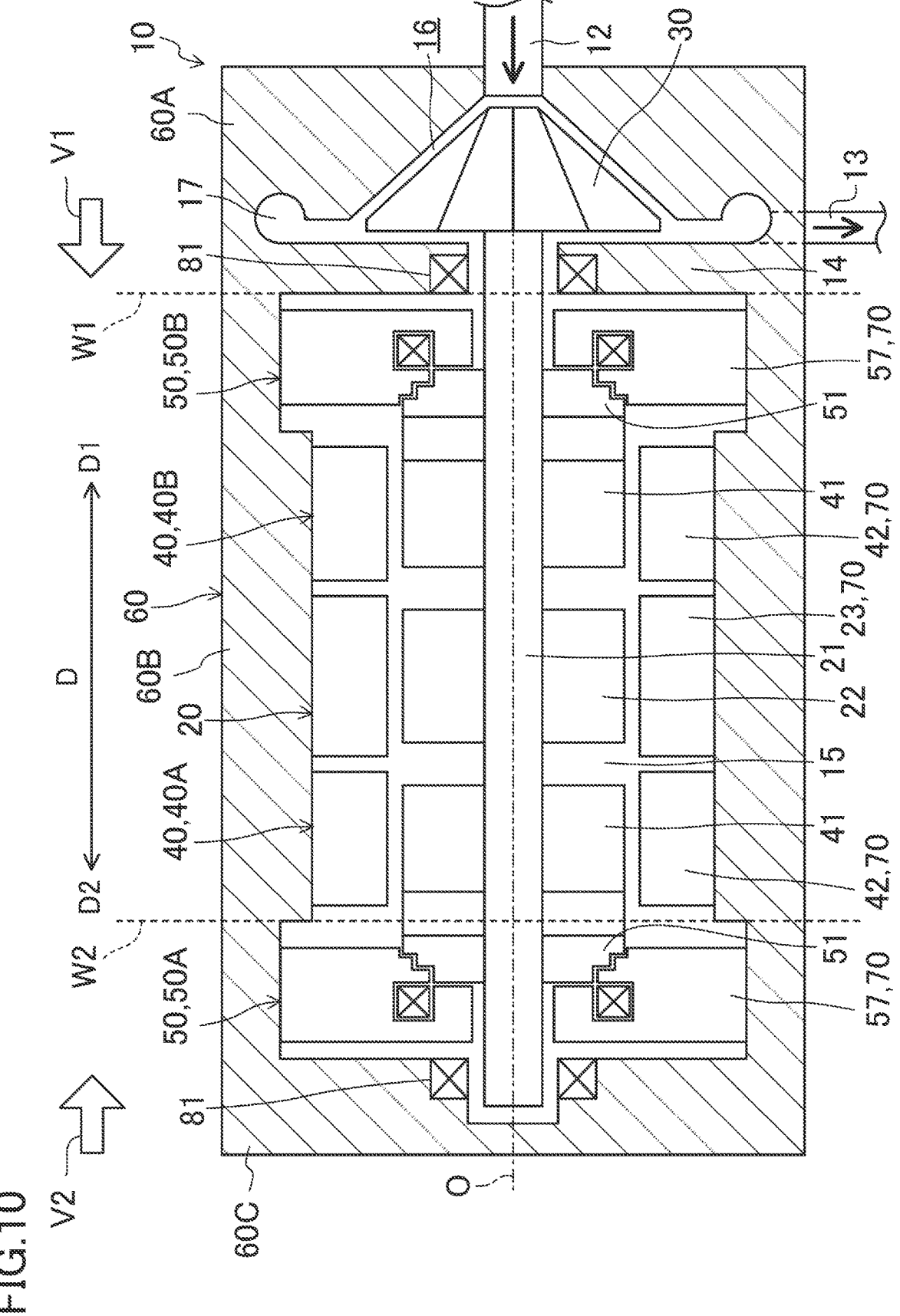
FIG. 10 is a sectional end view showing a first example of a structure of a housing.

(3) A first example of the insertion direction of the stator cores (23), (42), and (57) into the housing (60) will be described with reference to FIG. 10. FIG. 10 shows a first example of the structure of the housing (60).

As shown in FIG. 10, one electric motor (20), two radial magnetic bearings (40), and two thrust magnetic bearings (50) are provided in the housing (60). The two radial magnetic bearings (40) include a radial magnetic bearing (40A) disposed on the other direction side (D2) in the axial direction (D) and a radial magnetic bearing (40B) disposed on the one direction side (D1) in the axial direction (D). The two thrust magnetic bearings (50) include a thrust magnetic bearing (50A) disposed on the other direction side (D2) in the axial direction (D) and a thrust magnetic bearing (50B) disposed on the one direction side (D1) in the axial direction (D). In the housing (60), the electric motor (20), the radial magnetic bearing (40A), the radial magnetic bearing (40B), the thrust magnetic bearing (50A), and the thrust magnetic bearing (50B) are arranged in the order of the thrust magnetic bearing (50A), the radial magnetic bearing (40A), the electric motor (20), the radial magnetic bearing (40B), and the thrust magnetic bearing (50B) toward the one direction side (D1) in the axial direction (D).

As shown in FIG. 10, the housing (60) is divided into three parts by a dotted line W1 and a dotted line W2. The dotted line W1 is positioned between the thrust magnetic bearing (50A) and the radial magnetic bearing (40A). The dotted line W2 is positioned on the one direction side (D1) in the axial direction (D) with respect to the thrust magnetic bearing (50B). The housing (60) is divided by the dotted line W1 and the dotted line W2, and thus includes a central housing portion (60B), a one-side housing portion (60A) positioned on the one direction side (D1) of the central housing portion (60B), and an other-side housing portion (60C) positioned on the other direction side (D2) of the central housing portion (60B). Each of the one-side housing portion (60A) and the other-side housing portion (60C) is attachable to and detachable from the central housing portion (60B).

In a state where the other-side housing portion (60C) is separated from the central housing portion (60B), each of the stator core (42) of the radial magnetic bearing (40A) and the stator core (23) of the electric motor (20) is inserted into the central housing portion (60B) from the other-direction side (D2) (see arrow V2), and is fixed to the central housing portion (60B).

In a state where the one-side housing portion (60A) is separated from the central housing portion (60B), each of the stator core (42) of the radial magnetic bearing (40B) and the stator core (57) of the thrust magnetic bearing (50B) is inserted into the central housing portion (60B) from the one direction side (D1) (see arrow V1), and is fixed to the central housing portion (60B).

In the above-described stator-core-(70) fixing structure (100) to the stator-core-(70) fixing structure (700) (see FIGS. 2 to 9), as indicated by the arrow V2 in FIG. 10, it is assumed that the stator core (70) is moved to the one direction side (D1) in the axial direction (D), inserted into the housing (60), and is fixed to the housing (60). However, the present invention also includes a structure in which, as indicated by the arrow V1 in FIG. 10, the stator core (70) is moved to the other direction side (D2) in the axial direction (D), inserted into the housing (60), and fixed to the housing (60). In this case, in FIGS. 2 to 9, the illustration of the structure of the stator core (70) and the housing (60) becomes an illustration of the structure thereof in a horizontally inverted manner.

Figure 11:
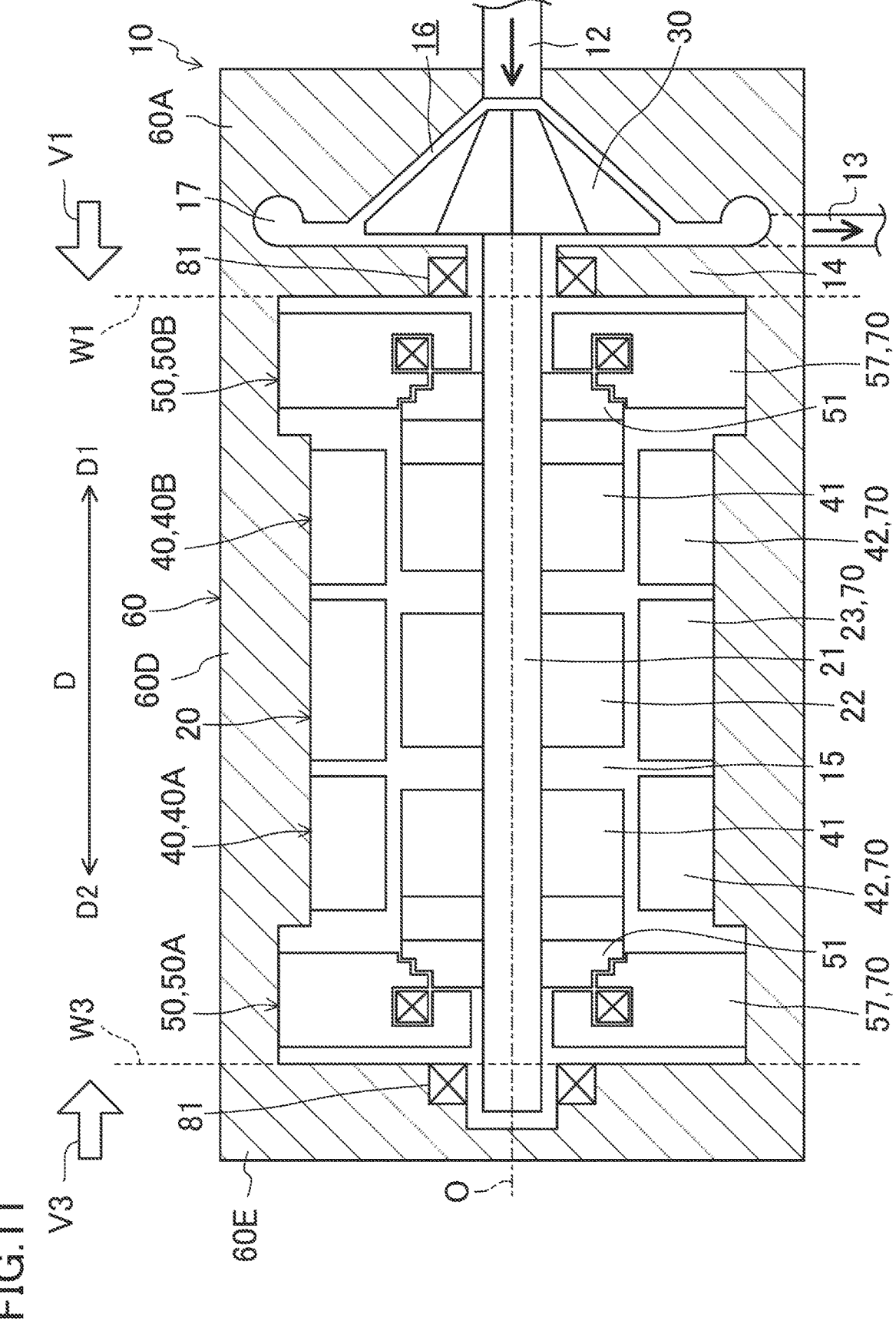
FIG. 11 is a sectional end view showing a second example of a structure of a housing.

(4) A second example of the insertion direction of the stator cores (23), (42), and (57) into the housing (60) will be described with reference to FIG. 11. FIG. 11 shows a second example of the structure of the housing (60).

As shown in FIG. 11, the housing (60) is divided into three parts by a dotted line W1 and a dotted line W3. The dotted line W3 is positioned on the other direction side (D2) in the axial direction (D) with respect to the thrust magnetic bearing (50A). The housing (60) is divided by the dotted line W1 and the dotted line W3, and thus includes a central housing portion (60D), a one-side housing portion (60A) positioned on the one direction side (D1) of the central housing portion (60D), and an other-side housing portion (60E) positioned on the other direction side (D2) of the central housing portion (60D). Each of the one-side housing portion (60A) and the other-side housing portion (60E) is attachable to and detachable from the central housing portion (60D).

With the other-side housing portion (60E) separated from the central housing portion (60D), each of the stator core (57) of the thrust magnetic bearing (50A), the stator core (42) of the radial magnetic bearing (40A), and the stator core (23) of the electric motor (20) is inserted into the central housing portion (60D) from the other direction side D2 (see arrow V3), and fixed to the central housing portion (60B).

In a state where the one-side housing portion (60A) is separated from the central housing portion (60D), each of the stator core (42) of the radial magnetic bearing (40B) and the stator core (57) of the thrust magnetic bearing (50B) is inserted into the central housing portion (60D) from the one direction side (D1) (see arrow V1), and is fixed to the central housing portion (60D).

(5) As shown in FIGS. 10 and 11, the stator core of the first magnetic bearing, which is one of the magnetic bearings (40,50), and at least one of an actuator and a sensor of the second magnetic bearing, which is the other of the magnetic bearings (40,50), may be inserted into the housing (60) (into the central housing portion (60B, 60D)) and may be inserted from directions opposite to each other when being fixed to the housing (60). With the stator core of the first magnetic bearing and the actuator and/or sensor of the second magnetic bearing fixed in the housing (60), the plurality of inner peripheral surface portions of the housing (60) are arranged such that the inner diameters decrease in order in the insertion direction of the stator core of the first magnetic bearing into the housing (60), and the second magnetic bearing and the actuator and/or the sensor of the second magnetic bearing are provided on the insertion direction side with respect to the stator core of the first magnetic bearing. The actuator of the second magnetic bearing levitates, for example, the rotor of the second magnetic bearing. The sensor of the second magnetic bearing is a sensor related to control of the second magnetic bearing, and includes, for example, a displacement sensor that detects the displacement of the drive shaft (21). The outer peripheral surface of the stator core of the first magnetic bearing and a portion of the inner peripheral surface of the housing (60) to which the stator core of the first magnetic bearing is fixed are formed in a stepped shape as shown in FIGS. 2 to 9. The outer peripheral surface of the stator core of the second magnetic bearing and a portion of the inner peripheral surface of the housing (60) to which the stator core of the second magnetic bearing is fixed may be formed in a stepped shape as shown in FIGS. 2 to 9, or may not be formed in a stepped shape (for example, may be formed in a flat shape).

For example, as shown in FIG. 10, the stator core (57) of the thrust magnetic bearing (50B) is inserted into the housing (60) (into the central housing portion (60B)) from the one direction side (D1). In this case, the other direction side (D2) is the insertion direction of the stator core (42,57) into the housing (60). In this case, the plurality of inner peripheral surface portions of the housing (60) to which the stator core (57) of the magnetic bearing (50B) is fixed (contacts) are arranged such that the inner diameters decrease in order toward the other direction side (D2), which is the insertion direction. In this case, the actuator and/or the sensor of the radial magnetic bearing (40B) may be inserted into the housing (60) (into the central housing portion (60B)) from the other direction side (D2)), and may be provided on the other direction side (D2) with respect to the stator core (57) of the magnetic bearing (50B).

(6) As shown in FIGS. 10 and 11, when the stator core (23) of the electric motor (20) and at least one of the actuator of the magnetic bearing and the sensor of the magnetic bearing are inserted into the housing (60) and fixed to the housing (60), they may be inserted from directions opposite to each other. "Magnetic bearing" refers any of the magnetic bearings (40,50). In a state where the stator core (23) of the electric motor (20) and the actuator and/or the sensor of the magnetic bearing are fixed in the housing (60), the plurality of inner peripheral surface portions of the housing (60) are arranged such that the inner diameters decrease in order in the insertion direction of the stator core (23) of the electric motor (20) into the housing (60), and the magnetic bearing and the actuator and/or the sensor of the magnetic bearing are provided on the insertion direction side with respect to the stator core (23) of the electric motor (20). The outer peripheral surface of the stator core (23) of the electric motor (20) and a portion of the inner peripheral surface of the housing (60) to which the stator core (23) of the electric motor (20) is fixed are formed in a stepped shape as shown in FIGS. 2 to 9. The outer peripheral surface of the stator core of the magnetic bearing and the portion of the inner peripheral surface of the housing (60) to which the stator core of the magnetic bearing is fixed may be formed in a stepped shape as shown in FIGS. 2 to 9, or may not be formed in a stepped shape.

A case where the electric motor (20) is a bearingless motor will be described. When the stator core of the bearingless motor and at least one of the actuator of the magnetic bearing and the sensor of the magnetic bearing are inserted into the housing (60) and are fixed to the housing (60), they may be inserted from directions opposite to each other. In a state where the stator core of the bearingless motor and the actuator and/or the sensor of the magnetic bearing are fixed in the housing (60), the plurality of inner peripheral surface portions of the housing (60) are arranged such that the inner diameters decrease in order in the insertion direction of the stator core of the bearingless motor into the housing (60), and the magnetic bearing and the actuator and/or the sensor of the magnetic bearing are provided on the insertion direction side with respect to the stator core of the bearingless motor. The outer peripheral surface of the stator core of the bearingless motor and a portion of the inner peripheral surface of the housing (60) to which the stator core of the bearingless motor is fixed are formed in a stepped shape as shown in FIGS. 2 to 9. The outer peripheral surface of the stator core of the magnetic bearing and a portion of the inner peripheral surface of the housing (60) to which the stator core of the magnetic bearing is fixed may be formed in a stepped shape as shown in FIGS. 2 to 9, or may not be formed in a stepped shape.

A case where the electric motor (20) is a bearingless motor, and a plurality of bearingless motors (a first bearingless motor and a second bearingless motor) are fixed to the housing (60) will be described. When a first stator core of the first bearingless motor and a second stator core of the second bearingless motor are inserted into the housing (60) and fixed to the housing (60), the first stator core and the second stator core may be inserted from directions opposite to each other. In a state where the first stator core of the first bearingless motor and the second stator core of the second bearingless motor are fixed in the housing (60), the plurality of inner peripheral surface portions of the housing (60) are arranged such that the inner diameters decrease in order in the insertion direction of the first stator core into the housing (60), and the second bearingless motor is provided on the insertion direction side with respect to the first stator core of the first bearingless motor. An outer peripheral surface of the first stator core of the first bearingless motor and a portion of the inner peripheral surface of the housing (60) to which the first stator core of the first bearingless motor is fixed are formed in a stepped shape as shown in FIGS. 2 to 9. An outer peripheral surface of the second stator core of the second bearingless motor and a portion of the inner peripheral surface of the housing (60) to which the second stator core of the second bearingless motor is fixed may be formed in a stepped shape as shown in FIGS. 2 to 9, or may not be formed in a stepped shape.

As described above, the present disclosure is useful for a stator-core fixing structure, a magnetic bearing, an electric motor, a bearingless motor, a centrifugal compressor, and a fixing method.

The invention claimed is:

1. A stator-core fixing structure of a stator core fixed to a housing, the stator-core fixing structure comprising:
   a plurality of outer peripheral surface portions
      included in an outer peripheral surface of the stator core and
      having outer diameters different from each other;
   a plurality of inner peripheral surface portions
      included in an inner peripheral surface of the housing and
      having inner diameters different from each other;
   a stator core step portion formed on the outer peripheral surface of the stator core; and
   a housing step portion formed on the inner peripheral surface of the housing,
   the plurality of outer peripheral surface portions each corresponding to a corresponding one of the plurality of inner peripheral surface portions,
   each of the plurality of outer peripheral surface portions contacting the corresponding one of the plurality of inner peripheral surface portions,
   the stator core step portion being positioned between adjacent outer peripheral surface portions of the plurality of outer peripheral surface portions,
   the housing step portion being positioned between adjacent inner peripheral surface portions of the plurality of inner peripheral surface portions, and
   a position of the stator core step portion being from a position of the housing step portion in an axial direction of the stator core.

2. The stator-core fixing structure according to claim 1, wherein
   the plurality of outer peripheral surface portions are arranged such that the outer diameters decrease in order toward one of a first direction side and a second direction side in an axial direction of the stator core, and the plurality of inner peripheral surface portions are arranged such that the inner diameters decrease in order toward the one of the first direction side and the second direction side.

3. The stator-core fixing structure according to claim 1, further comprising:
   a protrusion
      formed on the inner peripheral surface of the housing and
      protruding toward an inner side of the housing,
   the protrusion facing, in an axial direction of the stator core, an end portion of the stator core in the axial direction.

4. The stator-core fixing structure according to claim 1, wherein
   in an axial direction of the stator core, a position of an end surface of the stator core and a position of an end surface of the housing are the same, or the end surface of the stator core is positioned further toward an inward side of the housing than the end surface of the housing.

5. The stator-core fixing structure according to claim 1, wherein
   the stator core step portion and the housing step portion contact each other.

6. The stator-core fixing structure according to claim 1, wherein
   the plurality of outer peripheral surface portions include a first outer peripheral surface portion to an M-th outer peripheral surface portion, with M being an integer of 2 or more,
   an n-th outer peripheral surface portion, with n being an integer of 1 or more and M or less, has a length of Hn in an axial direction of the stator core,
   an outer diameter of the n-th outer peripheral surface portion is larger than an outer diameter of an (n−1)-th outer peripheral surface portion,
   the plurality of inner peripheral surface portions include a first inner peripheral surface portion to an M-th inner peripheral surface portion,
   an n-th inner peripheral surface portion contacts the n-th outer peripheral surface portion,
   the n-th inner peripheral surface portion has a length of Cn in the axial direction of the stator core,
   an inner diameter of the n-th inner peripheral surface portion is larger than an inner diameter of an (n−1)-th inner peripheral surface portion, and
   $C1>H2$, $C1+C2>H2+H3$, and $\Sigma(i=1, 2, \ldots, n-1)Ci>\Sigma(i=1, 2, \ldots, n)Hi$.

7. The stator-core fixing structure according to claim 1, further comprising:
   a recessed portion
      formed in the inner peripheral surface of the housing and
      not contacting the outer peripheral surface of the stator core.

8. The stator-core fixing structure according to claim 1, wherein
   the stator core is provided in a first magnetic bearing,
   the first magnetic bearing and a second magnetic bearing are fixed to the housing,
   the plurality of inner peripheral surface portions of the housing are arranged such that the inner diameters decrease in order in an insertion direction of the stator core into the housing, and at least one of an actuator of the second magnetic bearing and a sensor of the second magnetic bearing is provided on an insertion direction side of the stator core with respect to the stator core.

9. The stator-core fixing structure according to claim 1, wherein the stator core is provided in an electric motor, the electric motor and a magnetic bearing are fixed to the housing, the plurality of inner peripheral surface portions of the housing are arranged such that the inner diameters decrease in order in an insertion direction of the stator core into the housing, and at least one of an actuator of the magnetic bearing and a sensor of the magnetic bearing is provided on an insertion direction side of the stator core with respect to the stator core.

10. The stator-core fixing structure according to claim 1, wherein the stator core is provided in a bearingless motor, the bearingless motor and a magnetic bearing are fixed to the housing, the plurality of inner peripheral surface portions of the housing are arranged such that the inner diameters decrease in order in an insertion direction of the stator core into the housing, and at least one of an actuator of the magnetic bearing and a sensor of the magnetic bearing is provided on an insertion direction side of the stator core with respect to the stator core.

11. The stator-core fixing structure according to claim 1, wherein the stator core is provided in a first bearingless motor, the first bearingless motor and a second bearingless motor are fixed to the housing, the plurality of inner peripheral surface portions of the housing are arranged such that the inner diameters decrease in order in an insertion direction of the stator core of the first bearingless motor into the housing, and the second bearingless motor is provided on an insertion direction side of the stator core with respect to the stator core.

12. A magnetic bearing including the stator core according to claim 1.

13. An electric motor including the stator core according to claim 1.

14. A bearingless motor including the stator core according to claim 1.

15. A centrifugal compressor including the stator-core fixing structure according to claim 1.

16. A fixing method of fixing a magnetic device and a first magnetic bearing to a housing, the magnetic device including a stator core, the fixing method comprising:

inserting the stator core into the housing from one of a first direction side and a second direction side in an axial direction of the stator core; and inserting at least one of an actuator of the first magnetic bearing and a sensor of the first magnetic bearing into the housing from an other of the first direction side and the second direction side in the axial direction, an outer peripheral surface of the stator core including a plurality of outer peripheral surface portions having outer diameters different from each other, an inner peripheral surface of the housing including a plurality of inner peripheral surface portions having inner diameters different from each other, the plurality of outer peripheral surface portions each corresponding to a corresponding one of the plurality of inner peripheral surface portions, when the magnetic device is fixed to the housing, each of the plurality of outer peripheral surface portions contacting the corresponding one of the plurality of inner peripheral surface portions, a stator core step portion formed on the outer peripheral surface of the stator core being positioned between adjacent outer peripheral surface portions of the plurality of outer peripheral surface portions, a housing step portion formed on the inner peripheral surface of the housing being positioned between adjacent inner peripheral surface portions of the plurality of inner peripheral surface portions, and a position of the stator core step portion being different from a position of the housing step portion in an axial direction of the stator core, the magnetic device being a second magnetic bearing, an electric motor, or a bearingless motor.

17. A fixing method of fixing a first bearingless motor including a first stator core and a second bearingless motor including a second stator core to a housing, the fixing method comprising:

inserting the first stator core into the housing from one of a first direction side and a second direction side in an axial direction of the first stator core; and inserting the second stator core into the housing from an other of the first direction side and the second direction side in the axial direction, an outer peripheral surface of the first stator core including a plurality of outer peripheral surface portions having outer diameters different from each other, an inner peripheral surface of the housing including a plurality of inner peripheral surface portions having inner diameters different from each other, the plurality of outer peripheral surface portions each corresponding to a corresponding one of the plurality of inner peripheral surface portions, and when the first bearingless motor is fixed to the housing, each of the plurality of outer peripheral surface portions contacting the corresponding one of the plurality of inner peripheral surface portions, a stator core step portion formed on the outer peripheral surface of the stator core being positioned between adjacent outer peripheral surface portions of the plurality of outer peripheral surface portions, a housing step portion formed on the inner peripheral surface of the housing being positioned between adjacent inner peripheral surface portions of the plurality of inner peripheral surface portions, and a position of the stator core step portion being different from a position of the housing step portion in an axial direction of the stator core.

* * * * *